(12) United States Patent
Huang

(10) Patent No.: US 7,750,501 B2
(45) Date of Patent: Jul. 6, 2010

(54) SYSTEM AND METHOD OF OVER VOLTAGE CONTROL FOR A POWER SYSTEM

(75) Inventor: Fengtai Huang, Northville, MI (US)

(73) Assignee: Continental Automotive Systems US, Inc., Auburn Hills (*) Notice: Subject to any disclaimer, the term of this patent is extended or adjusted under 35 U.S.C. 154(b) by 658 days.

(21) Appl. No.: 11/262,519

(22) Filed: Oct. 27, 2005

(65) Prior Publication Data
US 2007/0097569 A1    May 3, 2007

(51) Int. Cl.
H02J 3/00 (2006.01)
H02J 5/00 (2006.01)
G01R 31/28 (2006.01)
H02H 7/06 (2006.01)

(52) U.S. Cl. .............. 307/45; 307/25; 307/26; 307/29; 307/85; 307/86; 324/511; 324/771; 361/21

(58) Field of Classification Search ............ 361/21; 324/511, 771; 307/10.7, 23, 25, 26, 29, 45, 307/46, 85, 86, 64
See application file for complete search history.

(56) References Cited

U.S. PATENT DOCUMENTS

| | | | |
|---|---|---|---|
| 5,796,175 A | 8/1998 | Itoh et al. ............... 307/10.1 |
| 5,801,498 A | 9/1998 | Kusano et al. ............ 318/139 |
| 5,898,556 A * | 4/1999 | de Sedouy et al. .......... 361/37 |
| 6,239,566 B1 | 5/2001 | Tareilus et al. |
| 6,278,256 B1 | 8/2001 | Aoyama .................. 318/801 |
| 6,489,778 B2 * | 12/2002 | Martin .................... 324/500 |
| 6,624,635 B1 * | 9/2003 | Lui ........................ 324/426 |
| 7,084,588 B2 * | 8/2006 | Hampo et al. ............ 318/139 |
| 2001/0043072 A1 * | 11/2001 | Fritz ....................... 324/418 |
| 2004/0056616 A1 * | 3/2004 | Honda ..................... 318/434 |
| 2004/0099233 A1 * | 5/2004 | Fujimoto et al. ...... 123/142.5 R |
| 2004/0160214 A1 * | 8/2004 | Blair et al. ................ 320/118 |
| 2004/0222766 A1 | 11/2004 | Kuehner et al. |

FOREIGN PATENT DOCUMENTS

EP  1 297 992  4/2003
JP  2004 015936  1/2004

OTHER PUBLICATIONS

Hampo et al., Canadian Patent Application No. 2514093, filed Jul. 29, 2005.
U.S. Appl. No. 10/903,918, filed Jul. 30, 2004, Hampo et al.

(Continued)

Primary Examiner—Albert W Paladini
Assistant Examiner—Hal I Kaplan

(57) ABSTRACT

A system and method for preventing over voltages in a power system coupled to an electric machine are disclosed. Briefly described, one embodiment is a method comprising detecting an operating voltage on a high voltage direct current (HVDC) bus, determining if at least one component of the power system is operational, communicating a signal to a power converter of the power system when the detected operating voltage is greater than a threshold voltage and when the component is not operational, and shorting together a plurality of terminals of the electric machine.

45 Claims, 7 Drawing Sheets

OTHER PUBLICATIONS

U.S. Appl. No. 11/144,378, filed Jun. 3, 2005, Cheng et al.
U.S. Appl. No. 11/176,966, filed Jul. 6, 2005, Deng et al.
U.S. Appl. No. 11/184,545, filed Jul. 18, 2005, Chen et al.
U.S. Appl. No. 60/662,707, filed Mar. 17, 2005, Flett et al.
U.S. Appl. No. 60/688,310, filed Jun. 7, 2005, Flett et al.
U.S. Appl. No. 60/695,829, filed Jun. 30, 2005, Soudier et al.
Search Report for PCT Application No. PCT/US2006/041890, Sep. 13, 2007.

* cited by examiner

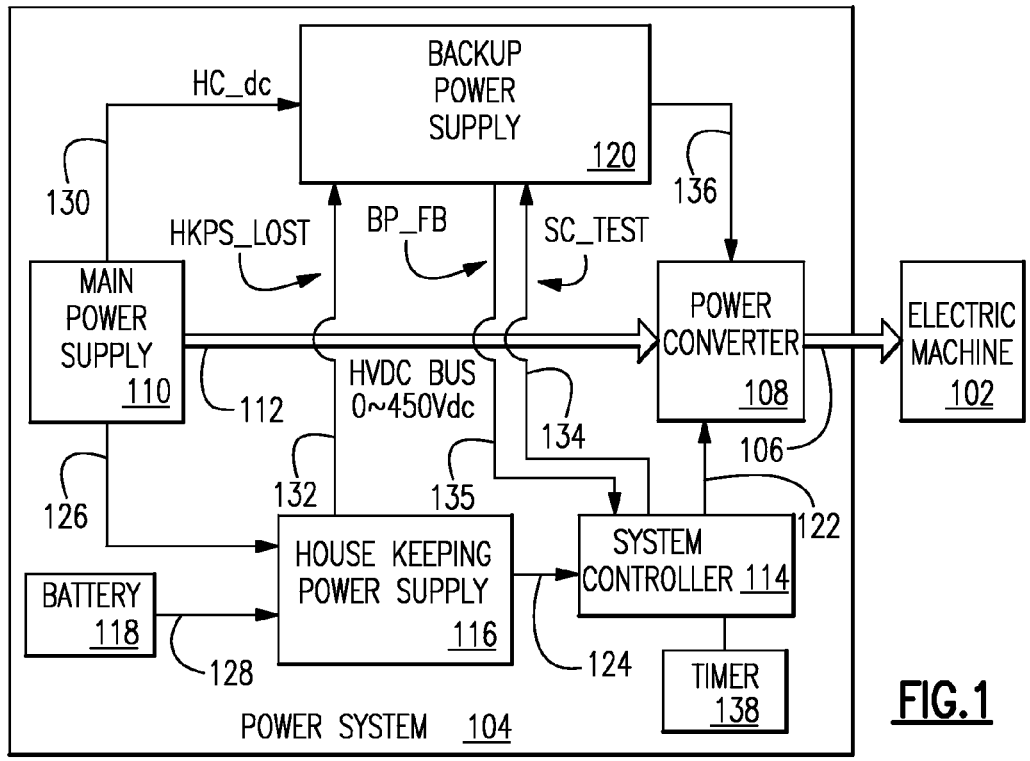
FIG. 1
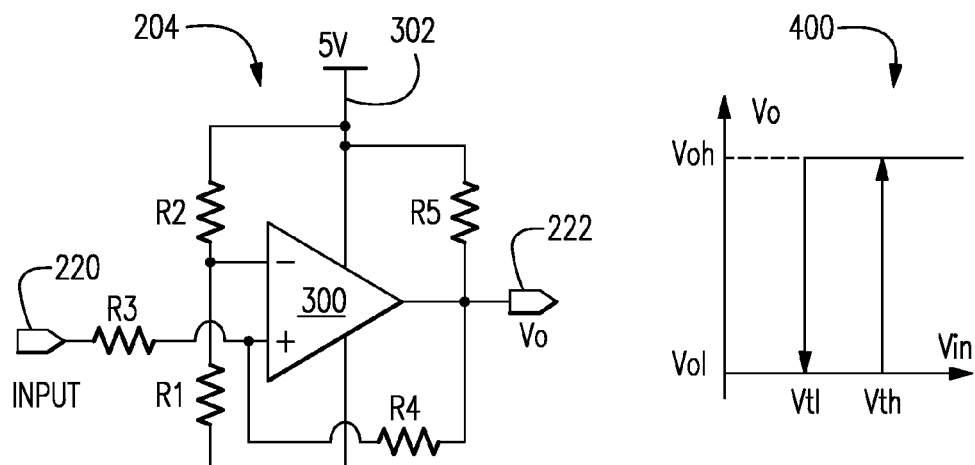
FIG. 3
FIG. 4

SYSTEM AND METHOD OF OVER VOLTAGE CONTROL FOR A POWER SYSTEM

BACKGROUND OF THE INVENTION

1. Field of the Invention

This disclosure generally relates to electrical power systems, and more particularly to power system architectures suitable for controlling over voltages on a DC power bus system.

2. Description of the Related Art

An alternating current (AC) electric machine may be coupled to a direct current (DC) system via a bi-directional power converter device. When the AC electrical machine is operating as a motor, the converter provides power to the AC electric machine by inverting DC power, received from a DC power source, into AC power. This AC power is delivered to the AC electric machine. Furthermore, the converter may control various operating aspects of the AC electric machine, such as speed and/or torque.

Alternatively, the AC electric machine may operate as a generator when torque is applied to the machine shaft. For example, when an AC electric machine driven motor vehicle is braking, running by inertia, or running downhill, the converter provides DC power to the DC power source by rectifying AC power, generated by the AC electric machine, into DC power. This mode of operation is sometimes referred to as the regenerative mode since the generated power is stored back into the vehicle's power system.

The DC side of the bi-directional power converter may be coupled to a high voltage (HV) DC bus. Other components are also typically coupled to the HVDC bus, including the DC power source. The DC power source and other components are designed to operate up to a maximum DC voltage on the HVDC bus. In the event that the DC voltage on the HVDC bus exceeds the maximum DC voltage, referred to hereinafter as an "over voltage" condition, the DC power source and/or other components may become damaged.

A system controller is typically employed to control operation of the power converter such that voltage on the HVDC bus is regulated (controlled). One of the functions of the system controller is to prevent over voltage conditions on the HVDC bus when the AC electric machine is operating in a generator mode.

The system controller requires a power source. In the event that power is lost to the system controller, voltage on the HVDC bus cannot be properly regulated via the power converter because the system controller becomes inoperable. That is, under some operating conditions, undesirable over voltages may occur on the HVDC bus.

BRIEF SUMMARY OF THE INVENTION

A system and method for preventing over voltages in a power system coupled to an electric machine are disclosed. Briefly described, in one aspect, an embodiment may be summarized as a method comprising detecting an operating voltage on a high voltage direct current bus, determining if at least one component of the power system is operational, communicating a signal to a power converter of the power system when the detected operating voltage is greater than a threshold voltage and when the component is not operational, and shorting together a plurality of terminals of the electric machine.

In another aspect, an embodiment may be summarized as a power system that powers an electric machine comprising, a converter operable to convert alternating current (AC) power received from the electric machine into direct current (DC) power when the electric machine is operating in a generation mode; a high voltage direct current bus configured to receive DC power from the converter; at least one component that enables operation of the power system; and a backup power supply operable to receive a status signal corresponding to an operating condition of the component, operable to receive a voltage signal corresponding to a detected operating voltage of the HVDC bus, and operable to communicate a signal to the power converter when both the detected operating voltage is greater than a threshold voltage and when the component is not operational, the backup power supply operable to cause a plurality of terminals of the electric machine to be shorted together in response to the signal.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 1 is a block diagram of a simplified electric machine and a power system according to one illustrated embodiment.

FIG. 3 is a block diagram illustrating an exemplary embodiment of a hysteresis comparator.

FIG. 4 is a voltage plot illustrating operation of the hysteresis comparator of FIG. 3 that employs upper and lower threshold values.

DETAILED DESCRIPTION OF THE INVENTION

Figure 2:
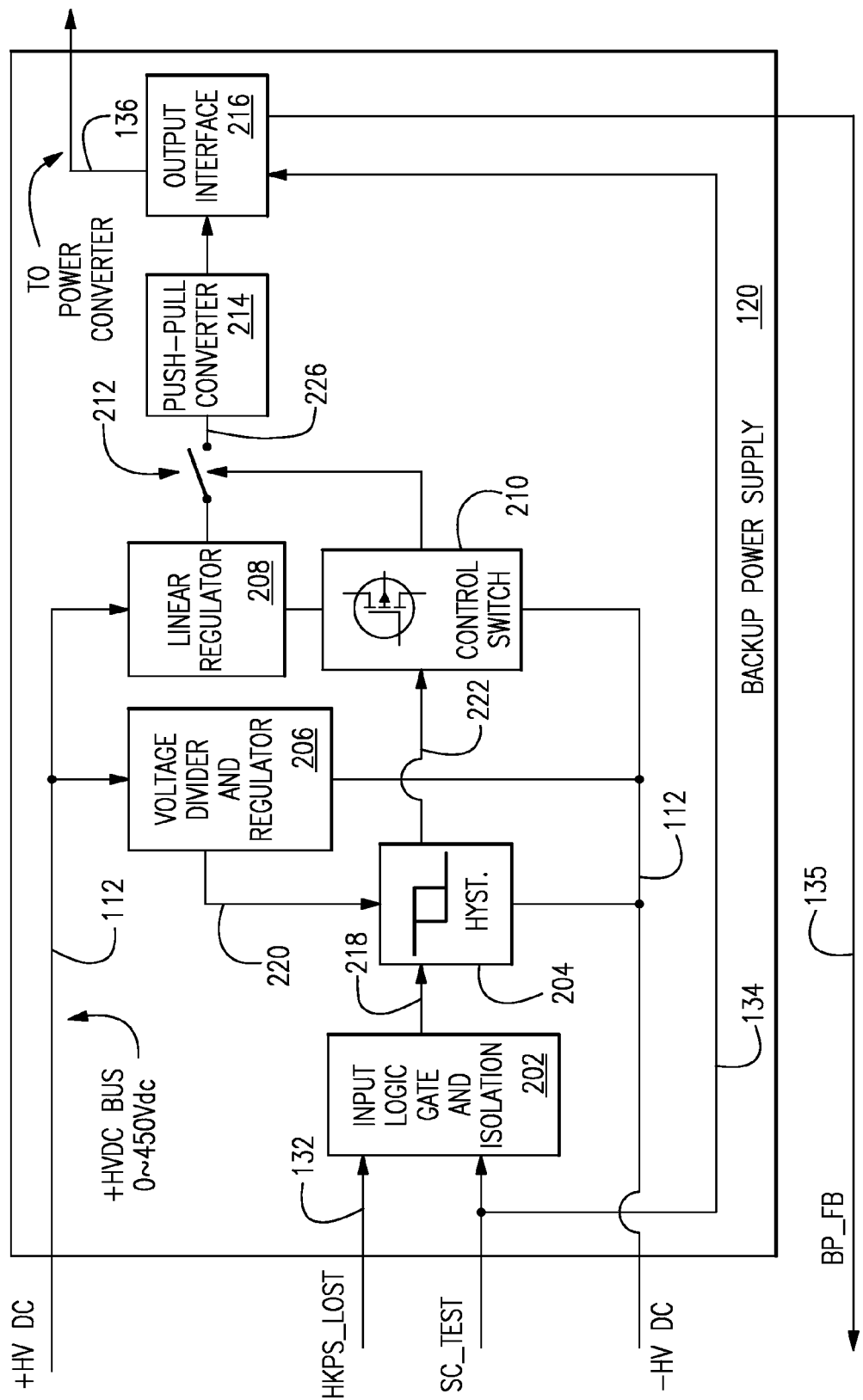
FIG. 2 is a block diagram illustrating in greater detail an exemplary embodiment of a backup power supply.

FIG. 1 is a block diagram of an electric machine 102 and a power system 104. The power system 104 may provide alternating current (AC) power to the electric machine 102, via an AC bus 106. In an exemplary embodiment, the electric machine 102 is a permanent magnet (PM) electric machine.

The power system 104 includes, among other components not shown, a bi-directional power converter 108, a main power supply 110, a HVDC bus 112, a system controller 114, a house keeping power supply (HKPS) 116, an battery 118 and a backup power supply 120. Embodiments of the system are described in greater detail hereinbelow.

The DC side of the power converter 108 and the main power supply 110 are coupled to the high voltage direct current (HVDC) bus 112. The electric machine 102 is coupled to the AC side of the power converter 108, via the AC bus 106.

When electric machine 102 is operating as a motor, the power converter 108 provides power to the electric machine 102 by inverting direct current (DC) power, received from the main power supply 110, into AC power. Alternatively, when the electric machine 102 is operating as a generator, the power converter 108 provides DC power to the main power supply 110 by rectifying AC power, generated by the electric machine 102, into DC power. For example, if the electric machine 102 is operating a motor vehicle, the electric machine 102 may operate in a generation mode when the vehicle is braking, running by inertia, or running downhill. During normal operating conditions, the power converter 108 may be actuated to regulate, control, and/or limit, the operating voltage on the HVDC bus 112.

As noted above, voltage of the HVDC bus 112 is regulated such that a maximum HVDC voltage is not exceeded. If the operating DC voltage exceeds the maximum HVDC voltage, one or more of the above-described components may become damaged.

During normal operating conditions, the system controller 114 provides a control signal(s), via connection(s) 122, such that components residing in the power converter 108 operate to regulate the DC operating voltage on, and control power transfers onto, the HVDC bus 112. Power is supplied to the system controller 114 by the HKPS 116, via connection 124. HKPS 116 typically receives power from the main power supply 110, via connection 126, and transforms and/or converts the received power to voltages and/or current suitable for operating the system controller 114. In the event that power is not available from the main power supply 110, an battery 118 may be used to provide a backup source of power to the system controller 114, via connection 128. Additionally, during startup, the HKPS 116 may receive power from the battery 118, via connection 128, and transform and/or convert the received power to voltages and/or current suitable for operating the system controller 114. Once the main power supply 110 is ready for full operation, the HKPS 116 may receive its power from the main power supply 110 rather than the battery 118.

Reliability of the above-described DC power system 104 may be an issue. For example, the DC power system 104 may be powering an electric machine 102 which operates machinery in which motor reliability may be very desirable. Accordingly, in the event that the HKPS 116 becomes inoperable such that DC voltage on the HVDC bus 112 exceeds the maximum HVDC voltage, various embodiments of the backup power supply 120 will operate to limit the DC voltage on the HVDC bus 112.

Embodiments of the backup power supply 120 are deactivated during normal operating conditions. This deactivated mode may be referred to as a "sleep" mode. So long as the voltage of the HVDC bus 112 remains at least below the maximum HVDC voltage, or at least equal to or less than an HVDC voltage threshold, embodiments of the backup power supply 120 remain in the sleep mode. The HVDC voltage threshold is selected to be a value at least less than the maximum HVDC voltage by a selected amount of margin. (Some embodiments may define the HVDC voltage threshold to equal the maximum HVDC voltage.)

As noted above, during some operating conditions the operating voltage on the HVDC bus 112 may exceed the HVDC voltage threshold. For example, when the HKPS 116 becomes inoperative, and the electric machine 102 is operating in a generation mode, the operating voltage on the HVDC bus 112 may increase in an undesirable and uncontrolled manner. In such operating conditions, described hereinbelow, the backup power supply 120 may be activated when the operating voltage on the HVDC bus 112 increases above the HVDC voltage threshold.

Embodiments of the backup power supply 120 monitor voltage of the HVDC bus 112, via connection 130. A status signal, or another suitable signal, denoted as "HV_dc" for convenience, is provided over connection 130 from the main power supply 110. HV_dc corresponds to the operating voltage of HVDC bus 112. In another embodiment, the backup power supply 120 includes components configured to directly monitor the operating voltage of HVDC bus 112. In a further embodiment, another device may provide the HV_dc signal to the backup power supply 120. In an alternate embodiment, the status signal HV_dc corresponds to whether or not the operating voltage of HVDC bus 112 is greater than or less than the HVDC voltage threshold (or an HVDC voltage threshold range defined by an upper HVDC voltage threshold and a lower HVDC voltage threshold, depending upon the embodiment). That is, voltage of the HVDC bus 112 is compared with an HVDC voltage threshold and indicates whether the voltage of the HVDC bus 112 is greater than or less than (and/or equal to) the HVDC voltage threshold.

Some embodiments of the backup power supply 120 may contain means to test the operability of the backup power supply 120 and/or to indicate the operational state of the backup power supply 120 to the system controller 114. For example, the system controller 114 may periodically (for example at system startup) send a suitable signal, denoted as "SC_Test" for convenience, over connection 134 to test the operational state of the backup power supply 120. The backup power supply 120 may then perform a self-test and respond to the system controller 114 by asserting a suitable feedback signal, denoted as "BP_FB" for convenience, to the system controller 114. In various embodiments, the signal BP_FB may be communicated over connection 135, over connection 134, or over another suitable connection, depending upon the particular communication scheme and/or signal formats used. Should the backup power supply 120 not be in an operational state, and not respond correctly to the SC_Test signal, then the system controller 114 may execute a protective routine to take appropriate corrective and/or preventative actions (for example, but not limited to, not allow the vehicle to start driving, and/or alert the driver).

In one exemplary scenario, the system controller 114 may become inoperable when the HKPS 116 is not able to provide input power to the system controller 114. For example, the HKPS 116 may become inoperable through a loss of power (from the main power supply 110 and/or the battery 118), or through a failure of an internal component. In this scenario, a suitable status signal or the like is provided over connection 132, denoted as "HKPS_lost" for convenience, from the HKPS 116 that indicates operating status of the HPKS 116. Accordingly, if the system HKPS 116 fails, the failed condition is detected by the backup power supply 120.

In another scenario, the system controller 114 may itself become inoperable, such as when a component of the system controller 114 fails. Here, a suitable status signal or the like may be provided from the system controller 114 that indicates operating status of the system controller 114. Accordingly, if the system controller 114 fails, the failed condition is detected by the backup power supply 120.

The above-described embodiment of the backup power supply 120 detects the operational status of the HKPS 116. For convenience, embodiments monitoring the operational status of the HKPS 116 were described above. Operational status of other devices of interest and/or their components may also be monitored by alternative embodiments of the backup power supply 120.

When a determination is made that the HKPS 116, or another monitored device and/or its components, has become inoperable, the backup power supply 120 provides a signal(s) to components in the power converter 108, via connection 136, such that the terminals of the electric machine 102 are electrically shorted. At least one effect of electrically shorting the terminals of the electric machine 102 is to cause the voltage of the HVDC bus 112 to decrease.

Power converter 108 contains a plurality of transistor devices 802 (FIG. 8), such as, but not limited to, field effect transistors (FETs), metal oxide semiconductor field effect transistors (MOSFETs), or insulated gate bipolar transistors (IGBTs) and associated anti-parallel diodes. Such transistor devices 802 may also be referred to as "power semiconductor devices." Accordingly, the signal(s) on connection 136 may be configured to actuate the transistors in the power converter 108 such that the terminals of the electric machine 102 become electrically shorted, thereby decreasing the operating voltage of the HVDC bus 112. In one embodiment, at least one gating signal is generated and/or communicated to a plurality of transistor devices, via connection(s) 136, such that when the transistor devices 802 are gated, the plurality of terminals of the electric machine 102 are shorted together. A specific exemplary embodiment is described in greater detail below.

A detailed description of a selected exemplary embodiment is described hereinbelow, and is illustrated in FIGS. 2-7. It is appreciated that the exemplary embodiment described below illustrates various principles of operation of an exemplary DC power system 104 employing a selected embodiment of the above-described backup power supply 120 (FIG. 1). The systems, devices and/or components described hereinbelow may be implemented using alternative systems, devices and/or components. Such systems, devices and/or components may have similar operation and/or functionality. Alternatively, such systems, devices and/or components may be configured differently than illustrated in FIGS. 2-7. Further, other systems, devices and/or components (not described herein or shown in FIGS. 2-7 for brevity) having different operation and/or functionality may be used.

Figure 8:
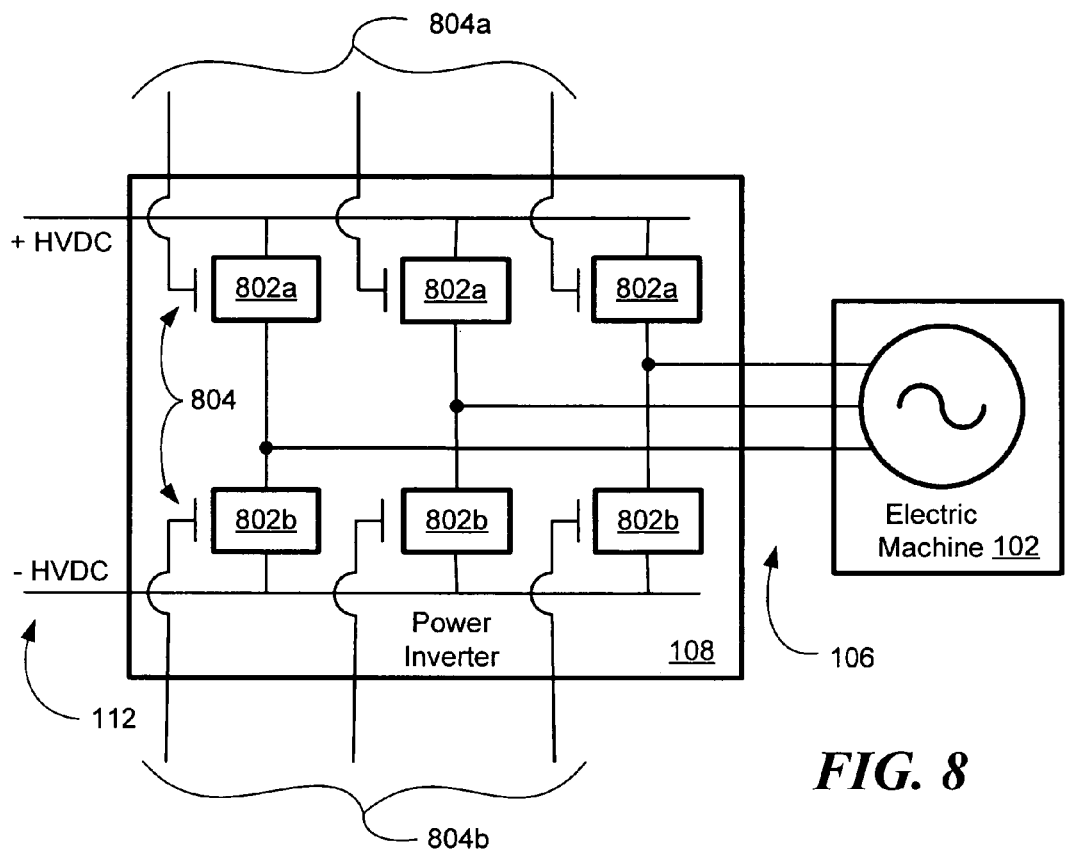
FIG. 8 is a block diagram of transistor devices residing in the power converter.

FIG. 2 is a block diagram illustrating in greater detail a selected exemplary embodiment of a backup power supply 120. The two inputs 132 and 134 to the backup power supply 120 are from the HKPS 116 (HKPS_lost input) and from the system controller 114 (SC_Test), respectively. The output 136 of the backup power supply 120 is sent to the gates of the transistor devices 802 (FIG. 8) residing in the power converter 108 (FIGS. 1 and 8). In an alternative embodiment, feedback is provided to the system controller 114 (FIG. 1), via connection 135 (BP_FB).

The backup power supply 120 can be activated by either of the above-described inputs 132, 134 conditionally. The condition is that the operating voltage of the HVDC bus 112 (FIG. 1), corresponding to the HV_dc signal, must at least exceed a voltage threshold. In this exemplary embodiment, the voltage threshold is set at 300 Vdc. Any suitable voltage threshold based upon design considerations of the DC power system and the intended operating voltage range on the HVDC bus 112 may be selected.

In various operating situations, the backup power supply 120 may be activated by a suitable signal (SC_Test) on connection 134. Such operating situations may include, but are not limited to, various tests that may be used to check the operational reliability of the backup power supply 120 without electrically shorting the terminals of the electric machine 102. That is, if the backup power supply is being tested (SC_Test signal is asserted), the above signals which cause shorting of the terminals would not be transmitted to the power converter 108 (unless the HKPS_lost signal and HV_dc bus signal are also asserted at the same time—see Table 1 below).

Accordingly, a switch 1104 (FIG. 11) residing in the output interface 216 would be operated such that the backup power supply 120 would not be coupled to the power converter 108. When testing is occurring in response to the SC_Test signal on connection 134, a feedback signal (BP_FB) corresponding to the test results are communicated back to the system controller 114, via connection 135.

For example, but not limited to, the system controller 114, via connection 134, may transmit the SC_Test signal to the backup power supply 120. If the output of the backup power supply 120 (that would otherwise be communicated onto connection 136, noting that the switch 1104 in the output interface 216 is open, in various embodiments) is correct, a suitable feedback signal (BP_FB) may be generated and communicated back to the system controller 114, via connection 135. System controller 114 then analyzes the feedback signal to assess the operational reliability of the backup power supply. It is appreciated that there are many types of tests, and their corresponding feedback signals, which may be performed on the backup power system 120 and/or components residing therein, and that such tests and feedback signals are too numerous to conveniently describe herein. All such tests and feedback signals are intended to be included herein within the scope of this disclosure.

The testing may be initiated upon various conditions. For example, during startup of the power system 104, it may be desirable to initiate a test of the backup power system 120. In some embodiments, it may be desirable to periodically perform testing on the backup power system 120. Accordingly, a timer 138 or the like could be coupled to, or reside within, the system controller 114 such that the timer 138 could periodically generate a signal or the like to periodically initiate the test. Other exemplary situations where it may be desirable to initiate a test of the backup power system 120 are described hereinbelow.

Assuming the logic levels for the two inputs 132 and 134 (HKPS_lost input and SC_Test) and the HV_dc bus (the detected operating voltage is above the 300 Vdc voltage threshold) are active low, and also assuming the feedback and output are active high, Table 1 gives the truth table of input-output relationships for one exemplary embodiment.

TABLE 1 input-output truth table

| HV dc bus > 300 V | HKPS lost input | SC_Test input | Feedback | Output |
|---|---|---|---|---|
| 1 | 1 | 1 | 0 | 0 |
| 1 | 1 | 0 | 0 | 0 |
| 1 | 0 | 1 | 0 | 0 |
| 1 | 0 | 0 | 0 | 0 |
| 0 | 1 | 1 | 0 | 0 |
| 0 | 1 | 0 | 1 | 0 |

TABLE 1-continued input-output truth table

| HV dc bus > 300 V | HKPS lost input | SC_Test input | Feedback | Output |
|---|---|---|---|---|
| 0 | 0 | 1 | 1 | 1 |
| 0 | 0 | 0 | 1 | 1 |

Table 1 indicates that (the first 4 states) if the operating voltage of the HVDC bus 112 is below 300 Vdc (logic 1), the backup power supply 120 will not be activated. Accordingly, there will be no output or feedback signal from the backup power supply 120 regardless the state of other inputs. If the operating voltage of the HVDC bus 112 is above 300 Vdc (logic 0), a feedback signal on connection 135 will be generated if either inputs or both are active low (logic 0). If the operating voltage of the HVDC bus 112 is above 300 Vdc (logic 0), an output signal on connection 136 will be generated if the HKPS_lost input is active low (logic 0). For example, the output signal from the backup power supply 120 will be generated if the HKPS_lost input signal is active low (logic 0) and the operating voltage of the HVDC bus 112 is above 300 Vdc (logic 0).

The backup power supply 120 includes at least the following functional blocks: input logic gate and isolation 202, hysteresis comparator 204, voltage divider and regulator 206, linear regulator 208, first control switch 210, second switch 212, push-pull converter 214 (also referred to herein as the dc/dc converter), and output interface 216. Operation of these components are described in greater below for the selected exemplary embodiment.

The input logic gate and isolation 202 block takes the two input signals (HKPS_lost input and SC_Test) through a logic AND gate, and then through an optical isolator (not shown). If either of the two inputs 132, 134 are active low, the output 218 will be in logic low state (enable). Only if both inputs 132, 134 are inactive, the output 218 will be in high impedance state (the disable state).

FIG. 3 is a block diagram illustrating one possible exemplary implementation of hysteresis comparator 204. The hysteresis comparator 204 block is a hysteresis voltage comparator. Input 220 for the hysteresis comparator 204 is from the voltage divider and regulator 206. The input 220 is controlled (enabled/disabled) with the output 218 of the input logic gate and isolation 202 block (enabling/disabling circuitry not shown). The exemplary hysteresis comparator 204 includes an input logic gate 300, a connection 302 to a reference voltage of 5 volts (5V), and five resistors (R1-R5). If either or both of the two inputs 132, 134 of the input logic gate and isolation 202 (FIG. 1) are active, the input 220 to the hysteresis comparator 204 will be enabled (enabling/disabling circuitry not shown).

FIG. 4 is a voltage plot 400 illustrating operation of the hysteresis comparator 204 (FIG. 3) that employs upper and lower threshold values. Output 222 of the hysteresis comparator 204 is determined by the measured voltage of the HVDC bus 112. If the voltage of the HVDC bus 112 is above an upper threshold value ($V_{TH}$), the output 222 of the hysteresis comparator 204 will be high. If the voltage of the HVDC bus 112 drops below a lower threshold value ($V_{TL}$), the output 222 of the hysteresis comparator 204 will be low. In the exemplary comparator of FIG. 3, the upper and lower threshold values are defined by the following formulas:

$$\frac{R_3}{R_4} = \frac{V_{TH} - V_{TL}}{V_{CC}} \text{ and} \quad (1)$$

$$\frac{R_2}{R_1} = \frac{V_{CC} - V_{TL}}{V_{TH}} \quad (2)$$

With this exemplary embodiment, the following parameters apply. Set the $V_{TH}$=2.981V and $V_{TL}$=2.481V, select R3 at 20 k, R4 will be 200 k and select R2 at 84.5 k, R1 will be 100 k. R5 in FIG. 3 is set at 10 k (R4>>R5) to serve as an external pull up. $V_{cc}$ is a supply voltage. $V_{TH}$ and $V_{TL}$ in equations (1) and (2) above are scaled representations of the HVDC bus 112 threshold values (see below).

The input 220 of the hysteresis comparator 204 is from the voltage divider and regulator 206 that is connected across the HVDC bus 112. In this exemplary embodiment, the scaling factor of the voltage divider is 0.99%. At the lower threshold, 2.481V, the corresponding dc bus is 251V. At the upper threshold, 2.981V, the corresponding dc bus is 301V. A 5V reference voltage is also tapped from the HV dc bus with a resistor and a voltage regulator. The 5V provides power to the input logic gate and isolation 202, hysteresis comparator 204 and control switch 210 blocks.

Figure 5:
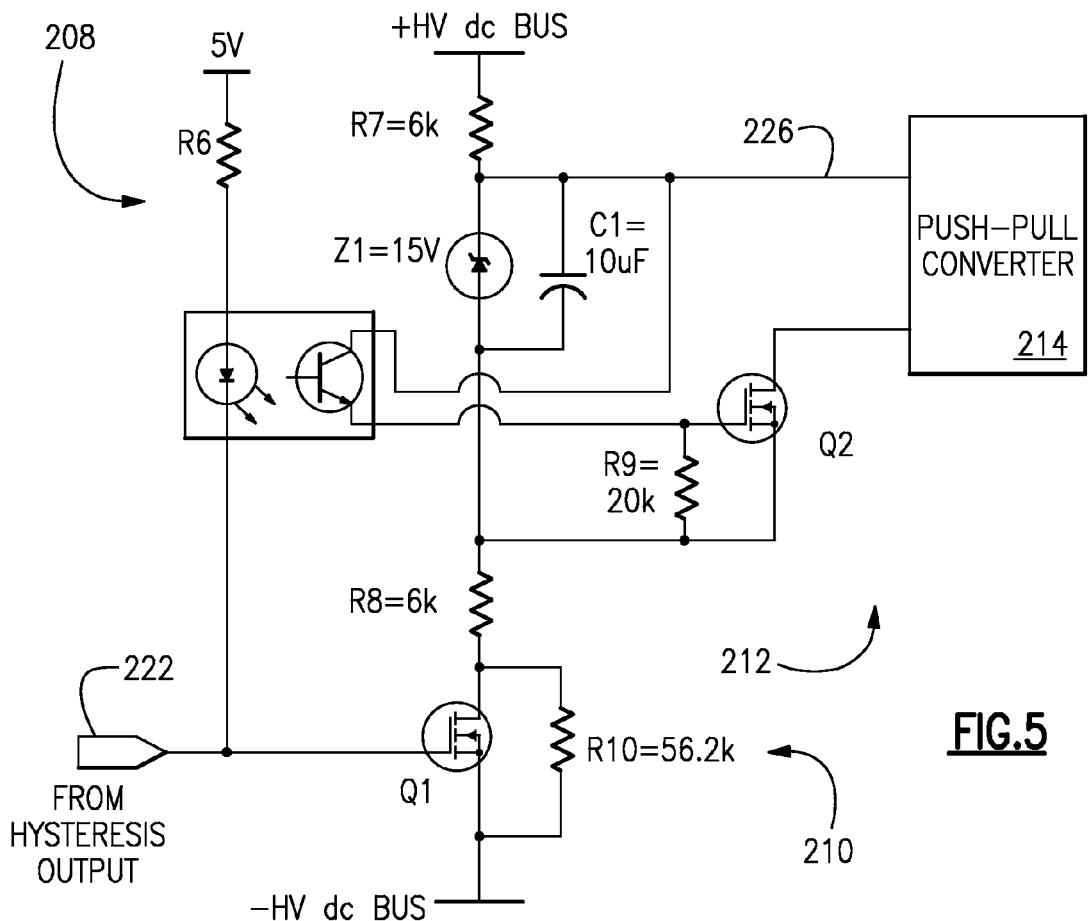
FIG. 5 is a block diagram illustrating two control switches and a linear regulator of the backup power supply shown in FIG. 2.

FIG. 5 is a block diagram illustrating the two control switches 210, 212 and the linear regulator 208 shown in FIG. 2. One switch, Q1, is used to connect/disconnect the linear regulator 208 (FIG. 2) to the HV DC bus. The other, Q2, is to connect/disconnect the linear regulator 208 to the push pull converter 214. The input 222 of the control switches is from the output of the hysteresis comparator 204. If the hysteresis comparator 204 is enabled with either or both HKPS_lost input and SC_Test input, and if the hysteresis comparator 204 input is above its upper threshold (equivalent to 300V DC bus), its output 222 will be high. FIGS. 2 and 5 illustrate that a high output from the hysteresis comparator 204 will switch on Q1 and Q2.

FIG. 5 further illustrates that the HV DC bus voltage is regulated to 15V by the linear regulator 208 with a zener diode, Z1. When control switches 210, 212 are not switched on, the storage capacitor, C1, is charged up to the regulated voltage 15V through the by-pass resistor R10. Current limiting resistors, R7 and R8, are selected such that at 250V dc bus, the push pull converter 214 can receive at least 20 mA. 20 mA is the input current required from the push pull converter 214 for this exemplary embodiment.

Figure 6:
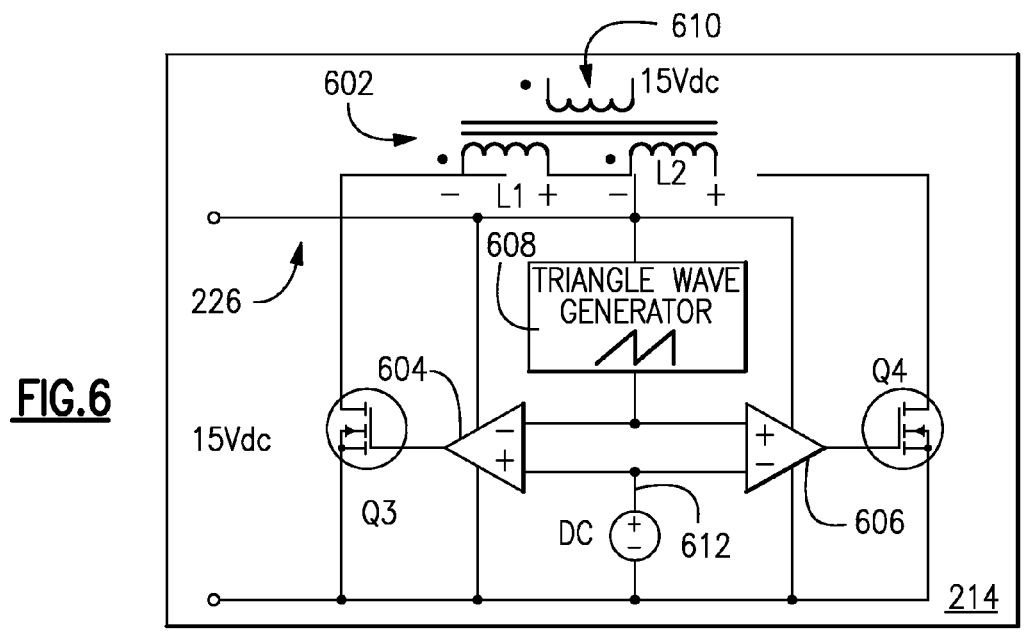
FIG. 6 is a block diagram illustrating an exemplary push pull converter of the backup power supply shown in FIG. 2.

FIG. 6 is a block diagram illustrating an exemplary push pull converter 214. The exemplary push pull converter 214 converts 15 Vdc 226 from the linear regulator 208 to a 15 Vac output 610 with a switching frequency of 200 kHz. The push pull converter 214 consists of a pulse transformer 602, two switching devices Q3 and Q4, two comparators 604 and 606, a voltage reference 612 (derived from 15 Vdc 226 with a voltage divider (not shown) in various embodiments) and a triangle wave generator 608. Upon the application of 15 Vdc connection 226, the output of the triangle wave generator 608 is compared with the voltage reference on connection 612. The outputs of the comparators 604 and 606 are always opposite in polarity. The opposite polarity at the gate of the two switch devices Q3 and Q4 will only switch on one of the switch devices Q3 and Q4 at any time.

The triangle wave generator 608 consists of a voltage comparator and a RC charging/discharging circuit (not shown). The reference point of the transformer windings is assigned such that the switching-in winding will automatically reset the magnetic field in the transformer core created with the out going winding.

Figure 7:
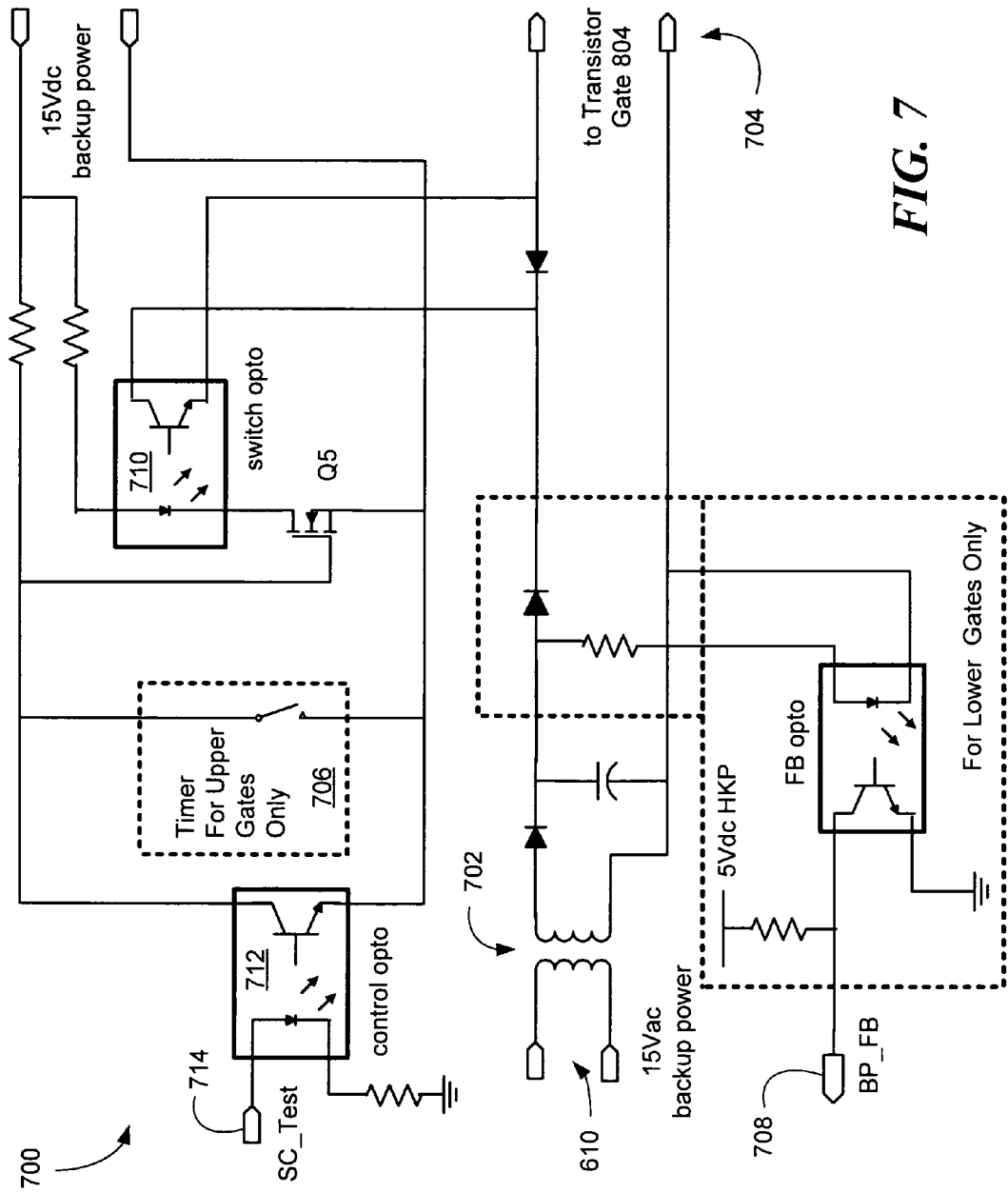
FIG. 7 is a block diagram illustrating one of the four interface circuits between the backup power supply and transistor gates.

FIG. 7 is a block diagram illustrating one of the six interface circuits 700 between the backup power supply 120 and transistor devices 802 (FIG. 8). The output on connection 610 of the push pull converter 214 drives four identical transformers 702 in parallel. After rectifying, the output of the transformer 702 is connected through a switch opto 710 to the gates 804 of the transistor devices 802, such as IGBT gates, in the power converter 108 (FIG. 1), via connections 704.

In this embodiment, if the SC_Test input signal on connection 714 is present (in the embodiment shown in FIG. 7 the SC_Test signal is an active high signal), backup power will not be connected to the gate 804 of a transistor device 802 (FIG. 8). In other embodiments, the backup power may be connected to the gate 804 of a transistor device 802 (FIG. 8) regardless of the state of the SC_Test input, if the house keeping power supply is lost and the HV_dc voltage is above a certain threshold (see Table 1 above). The backup power feedback (BP_FB) signal on connection 708 is always available if the backup power is available, regardless of the connection of backup power to the 804 gate of a transistor device 802. The BP_FB signal on connection 708 provides information to the system controller 114 when the system controller 114 sends a test signal (SC_Test 134) to the backup power supply 120.

As shown in FIG. 7, the connection of backup power to the gate 804 of a transistor device 802 is determined with the conduction of the switch opto 710. The conduction of the switch opto 710 is determined with the control opto 712 not conducting. If so, the SC_Test input 714 is not present. If the SC_Test input 714 is present, the control opto 712 is conducting. This will short the gate of the mosfet Q5. In turn, the switch opto 710 will not conduct and the backup power will not be connected to the gates 804 of a transistor device 802 (FIG. 8). If the SC_Test input is not present, the control opto 712 will not be conducting.

For the lower transistor devices 802b, the backup power is applied as soon as it is available. For the upper transistor devices 802a, the backup power will be applied after approximately 140μs (per timer 706). The introduction of the timer 706 allows time for the backup power to be gradually built up. To avoid operating the upper three transistor devices 802a in the linear range, the backup power will not be applied to the transistor gate until it is fully built up. Applying the backup power to the lower three transistor devices 802b (switching off) first also helps to prevent shoot through.

In one type of power converter 108 (FIG. 1), gates 804a of each of the upper three transistor devices 802a have their own backup power. The gates 804b of the lower three transistor devices 802b share the same backup power. The interface for the three gates 804a of the upper three transistor devices 802a has a timer 706. The feedback of the backup power is tapped out from the interfaces to the lower three transistor devices 802b.

FIG. 8 is a block diagram of transistor devices 802 residing in the power converter 108. Such transistor devices may be, but are not limited to, field effect transistors (FETs), metal oxide semiconductor field effect transistors (MOSFETs), or insulated gate bipolar transistors (IGBTs). Any suitable transistor device, or like controllable devices having similar operating functionality, may be used in a power converter 108.

Here, six transistor devices 802 reside in the power converter 108, three upper transistor devices 802a, and three lower transistor devices 802b. The transistor devices 802 are actuated by application of a signal on their respective gates 804. Accordingly, the signal(s) communicated from the backup power supply 120 to the power converter 108 causes an operational state of the plurality of transistor devices 802 to be set such that the plurality of terminals of the electric machine 102 are shorted together.

In the exemplary embodiment described herein, conditions for backup power (15 Vac and 15 Vdc) to be available are that the voltage of the HVDC bus 112 is at or above 300V, and either one or both of HKPS_lost input and SC_Test input is present. Conditions to connect the backup power to the gate 804 of a transistor device 802 are that the backup power is available and the SC_Test input is not present.

Figure 9:
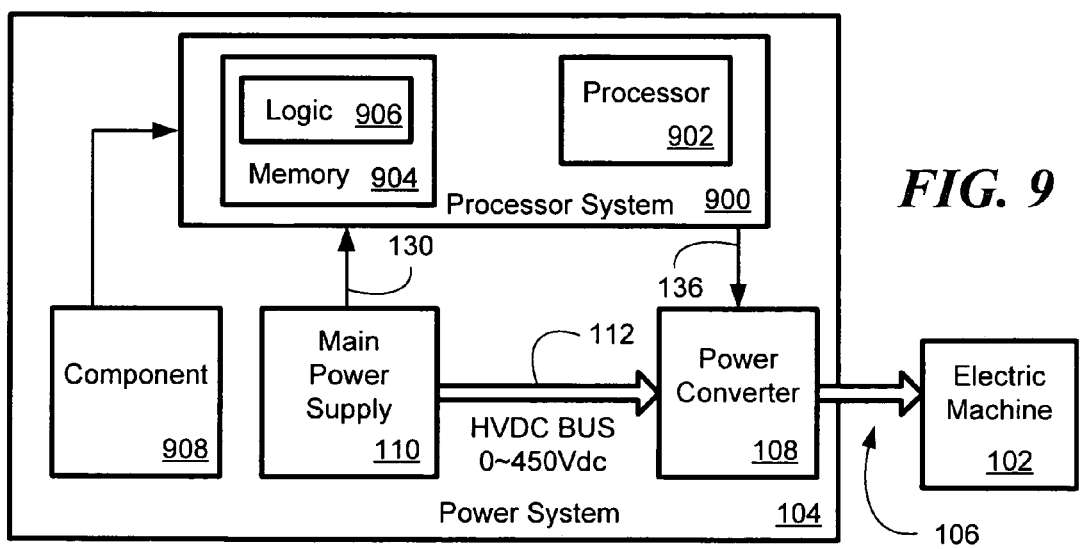
FIG. 9 is a simplified block diagram of a processor based embodiment of the backup power supply.

The above-described exemplary embodiment of the backup power supply is only one non-limiting example employed in a power system. Many different alternative embodiments are possible. FIG. 9 is a simplified block diagram of a processor based embodiment of the backup power supply. This exemplary backup power supply embodiment is implemented in a processor based system 900 having at least a processor 902 and a memory 904 (or other suitable computer-readable or processor-readable medium). Logic 906 for performing the above-described functions of a backup power supply resides in memory 904. Logic 906 may be implemented as a program. Thus, execution of the logic 906 by processor 902 detects the above operational status of a selected component 908 and the operating voltage of the HVDC bus 112 (FIG. 1) such that the terminals of the electric machine 102 are shorted when the operating voltage exceeds a threshold voltage and the selected component 908 becomes inoperable.

Figure 10:
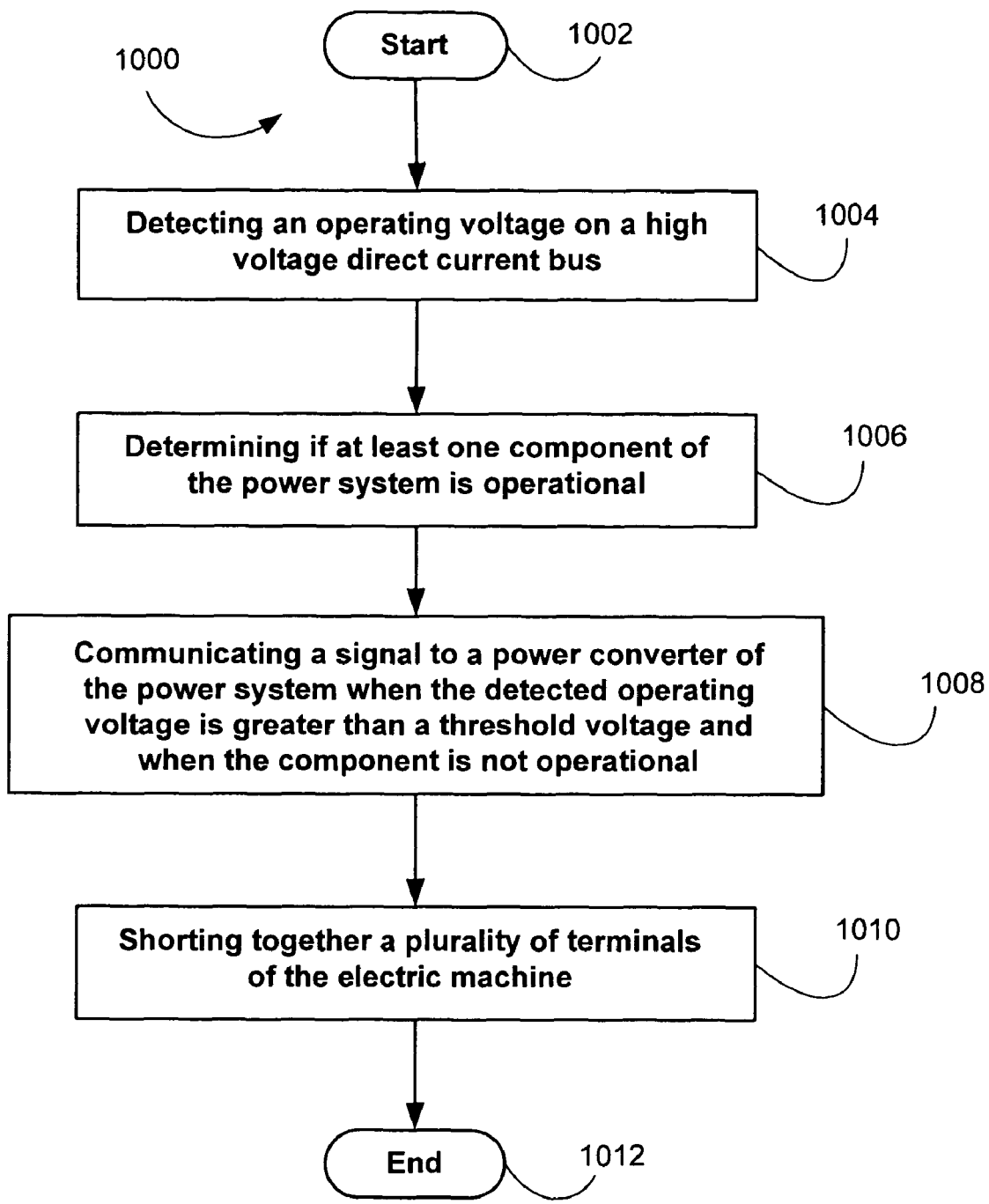
FIG. 10 is a flowchart illustrating an embodiment of a process for preventing over voltages in the DC power system of FIG. 1 coupled to the electric machine.

FIG. 10 is a flowchart 1000 illustrating an embodiment of a process for preventing over voltages in the DC power system 104 (FIG. 1) coupled to the electric machine 102. The flow chart 1000 of FIG. 10 shows the architecture, functionality, and operation of an embodiment for implementing the logic 906 (FIG. 9) such that the terminals of the electric machine 102 are shorted when the operating voltage exceeds a threshold voltage and the selected component 908 becomes inoperable. An alternative embodiment implements the logic of flow chart 1000 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIG. 10, or may include additional functions. For example, two blocks shown in succession in FIG. 10 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process begins at block 1002. At block 1004, an operating voltage is detected on a high voltage direct current (HVDC) bus. At block 1006, it is determined if at least one component of the power system is operational. At block 1008, a signal is communicated to a power converter of the power system when the detected operating voltage is greater than a threshold voltage and when the component is not operational. At block 1010, a plurality of terminals of the electric machine are shorted together. The process ends at block 1012.

Figure 11:
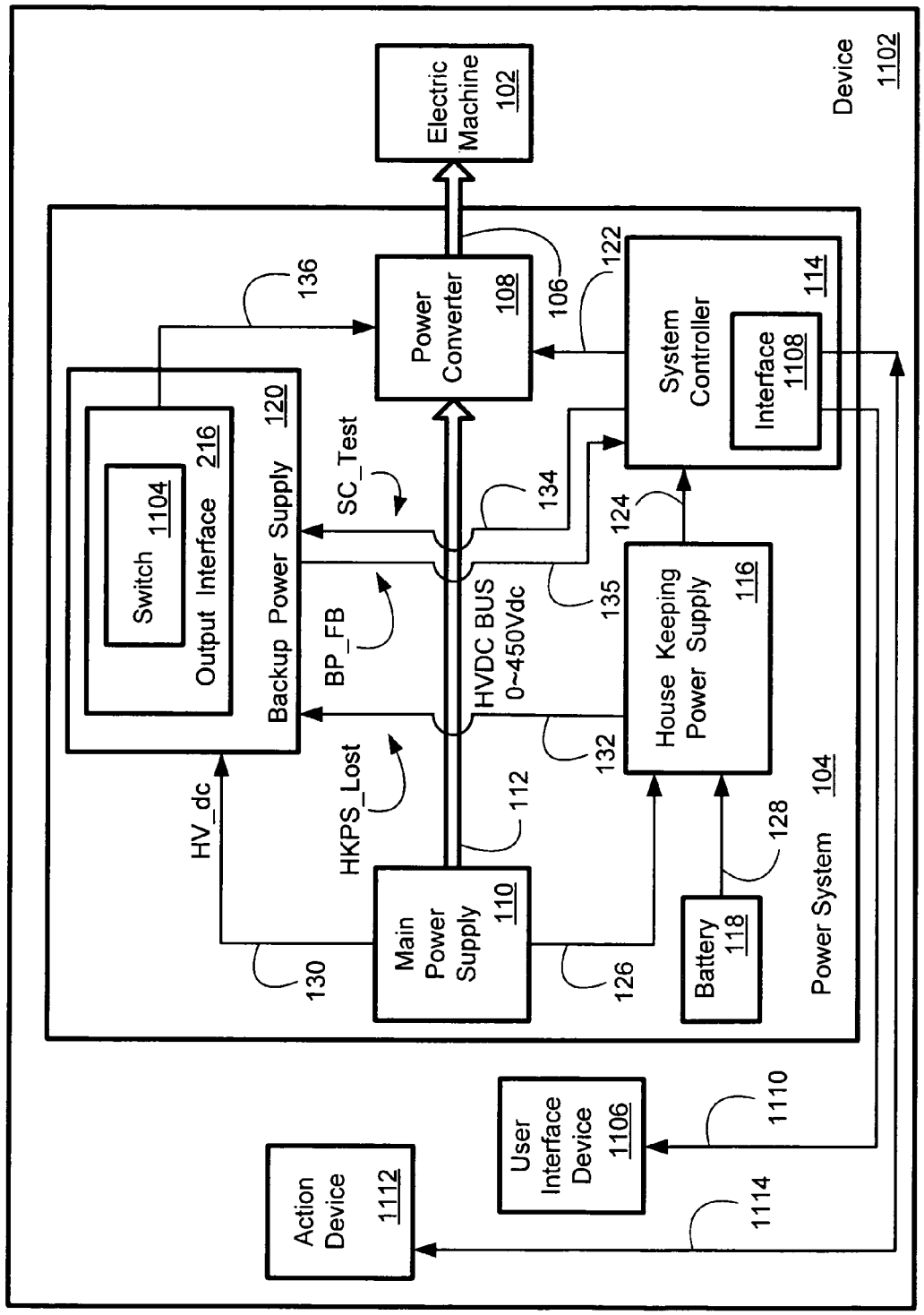
FIG. 11 is a block diagram of a device in which embodiments of the backup power supply are implemented.

FIG. 11 is a block diagram of a device 1102 in which embodiments of the backup power supply 120 are implemented. As noted above, in various operating situations, the backup power supply 120 may be activated by a suitable signal (SC_Test) on connection 134 (FIG. 1). Such operating situations may include, but are not limited to, various tests that may be used to check the operational reliability of the backup power supply 120 without electrically shorting the terminals of the electric machine 102. Accordingly, a switch 1104 residing in the output interface 216 would be operated such that the backup power supply 120 would not be coupled to the power converter 108 when the test is being conducted and/or when the test indicates that operation of the backup power supply 120 has failed or is not operating as intended. When a test is made in response to the SC_Test signal on connection 134, a feedback signal (BP_FB) corresponding to one or more test results is communicated back to the system controller 114, via connection 135.

For example, if the power system 104 is used to operate an electric vehicle (as the device 1102), there may be times when testing of the backup power supply 120 is conducted while the electric vehicle is in operation. In such situations, a switch residing in the output interface 216 would be operated such that the backup power supply 120 would not be coupled to the power converter 108. That is, the backup power supply 120 could be tested, yet the output signal(s) would not be communicated to the power converter 108 over connection 136 such that the terminals of the electric machine 102 are electrically shorted. Accordingly, the main power supply 110 would continue to supply power to the electric machine 102, via the power converter 108, so that operation of the electric vehicle continues concurrently with the testing of the backup power supply 120. It is appreciated that there are many situations wherein testing the backup power supply 120 without communicating the signals over connection 136 to the power converter 108 is desirable, and that such situations are too numerous to conveniently describe herein. All such situations are intended to be included herein within the scope of this disclosure.

When the system controller 114 performs the above-described test to assess the operation of the backup power supply 120, the system controller may output a suitable report or other indicator to other components of the power system 104 and/or to components of a device having the power system 104. For example, a user interface device 1106, such as a display screen or the like, may receive information from the system controller 114 indicating the results of the test of the backup power supply 120. Accordingly, system controller 114 would include a suitable interface 1108 configured to transmit the generated test report, via connection 1110, to the user interface device 1106 using a suitably formatted signal. In other embodiments, the user interface device 1106 may be any type of suitable test equipment, such as a meter or the like, or may even be a specialty type device configured to receive information over connection 1110 corresponding to the results of the test.

In another embodiment, in the event that the test indicates that the backup power supply 120 has failed and/or will not operate as intended, a suitable action may be taken. Accordingly, a suitable signal would be communicated form the interface 1108 to an action device 1112, via connection 1114. For example, but not limited to, the action device 1112 could be a safety device, a switch or the like, which may be actuated to prevent operation of the device having the power system 104. Or, action device 1112 could be an alarm device or the like.

In yet another embodiment, the action device 1112 could itself initiate the testing of the backup power supply 120. For example, during start up of the power system or of the device 1102, a switch or the like having another function could be operable to communicate a signal onto connection 1114 that is received by the system controller 114. In response, the system controller 114 would initiate the test of the backup power supply 120. For example, but not limited to, such a test could be initiated when a vehicle having embodiments of the power system 104 therein is started by a driver. Accordingly, the action device could be the starter switch itself, another device actuated upon vehicle starting, or a device operable to sense vehicle starting.

In another exemplary embodiment, the connection 135 may correspond to the connection 136 such that the switch 1104 in the output interface 216 is coupled to connection 135 or connection 136. If coupled to connection 135, the system controller 114 would be configured to directly analyze the above-described output of the backup power supply 120.

In the above-described various embodiments, the backup power supply 120 (FIG. 1) may employ a microprocessor, a digital signal processor (DSP), an application specific integrated circuit (ASIC) and/or a drive board or circuitry, along with any associated memory, such as random access memory (RAM), read only memory (ROM), electrically erasable read only memory (EEPROM), or other memory device storing instructions to control operation. The backup power supply 120 may be housed with the other components of the power system 104, may be housed separately therefrom, or may be housed partially therewith.

The above description of illustrated embodiments, including what is described in the Abstract, is not intended to be exhaustive or to limit the invention to the precise forms disclosed. Although specific embodiments of and examples are described herein for illustrative purposes, various equivalent modifications can be made without departing from the spirit and scope of the invention, as will be recognized by those skilled in the relevant art.

As used herein and in the claims, the terms "transistor device" and/or "power semiconductor device" may include semiconductor devices designed to handle large currents, large voltages and/or large amounts of power with respect to standard semiconductor devices, including power semiconductor switch devices, power semiconductor diodes and other such devices used in power distribution, for example, grid or transportation related applications.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the control mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present systems and methods. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to the following, are incorporated herein by reference, in their entirety:

U.S. patent application Ser. No. 11/144,378, filed Jun. 3, 2005, entitled METHOD AND APPARATUS FOR MEASURING FAULT DIAGNOSTICS ON INSULTED GATE BIPOLAR TRANSISTOR CONVERTER CIRCUITS; U.S. patent application Ser. No. 11/184,545, filed Jul. 18, 2005, entitled METHOD AND APPARATUS FOR MOTOR CONTROL; U.S. patent application Ser. No. 11/176,966, filed Jul. 6, 2005, entitled POWER CONVERTER SYSTEM; Canadian patent application 2514093, filed Jul. 29, 2005, entitled METHOD, APPARATUS AND ARTICLE FOR MOTOR CONTROL VOLTAGE DROPOUT DETECTION; U.S. patent application Ser. No. 60/662,707, filed Mar. 17, 2005, entitled DUAL FEED HIGH POWER BOOST CONVERTER (DC/DC/AC) FOR HYBRID & FUEL CELL ELECTRIC VEHICLES; U.S. patent application Ser. No. 60/688,310, filed Jun. 7, 2005, entitled POWER SYSTEM TOPOLOGIES EMPLOYING FUEL CELLS); and U.S. patent application Ser. No. 60/695,829, filed Jun. 30, 2005, entitled CONTROLLER METHOD, APPARATUS AND ARTICLE SUITABLE FOR ELECTRIC DRIVE.

The invention claimed is:

1. A power system that powers an electric machine, comprising:
   a converter operable to convert alternating current (AC) power received from the electric machine into direct current (DC) power when the electric machine is operating in a generation mode;
   a high voltage direct current (HVDC) bus configured to receive DC power from the converter;
   at least one component that enables operation of the power system; and
   a backup power supply operable to receive a status signal corresponding to an operating condition of the component, operable to receive a signal corresponding to a detected operating voltage of the HVDC bus, and operable to communicate a signal to the power converter when both the detected operating voltage is greater than a threshold voltage and when the component is not operational.

2. The system of claim 1 wherein the power converter is operable to cause a plurality of terminals of the electric machine to be shorted together in response to the signal.

3. The system of claim 1 wherein the power converter comprises a plurality of transistor devices, and wherein the signal communicated from the backup power supply to the power converter causes an operational state of the plurality of transistor devices to be set such that the plurality of terminals of the electric machine are shorted together.

4. The system of claim 1 wherein communicating a signal to the power converter further comprises communicating a plurality of gating signals to a plurality of transistor devices such that when the transistor devices are gated, the plurality of terminals of the electric machine are shorted together.

5. The system of claim 1 wherein the component comprises:
   a system controller operable to control operation of the power converter.

6. The system of claim 1 wherein the component comprises:
   a housekeeping power supply operable to supply power to at least a system controller, wherein the system controller is operable to control the operation of the power converter.

7. The system of claim 6 wherein the power produced by the backup power supply is electrically isolated from the power produced by the housekeeping power supply.

8. The system of claim 1 further comprising:
   a system controller operable to control operation of the power converter;
   a first connection configured to communicate a test signal generated by the system controller to the backup power supply to cause a testing of the backup power supply;
   said system controller being capable of initiating said test signal during continued operation of said power system; and
   a second connection configured to communicate a feedback signal generated by the backup power supply to the system controller in response to the received test signal.

9. The system of claim 8 wherein the system controller is further operable to execute a protective routine in response to the feedback signal.

10. The system of claim 9 wherein executing the protective routine comprises:
    prohibiting the electric power system from starting.

11. The system of claim 9 wherein executing the protective routine comprises:
    alerting the operator of the electric machine.

12. The system of claim 8 further comprising:
an output interface operable to decouple the backup power supply from the power converter in response to the received test signal.

13. The system of claim 8 wherein the test signal is generated in response to the initiation of a device wherein the power system resides.

14. The system of claim 8 wherein the test signal is generated in response to an event that occurs during operation of the electrical system.

15. The system of claim 1, further comprising:
a memory that stores at least logic to analyze the received status signal and the received voltage signal, determine when both the detected operating voltage is greater than a threshold voltage and when the component is not operational, and generate the signal to the power converter; and
a processor operable to retrieve and execute the logic.

16. A method for preventing over voltages in a power system coupled to a permanent magnet electric machine, comprising:
detecting an operating voltage on a high voltage direct current (HVDC) bus during continued operation of said power system;
determining if at least one component of the power system is operational;
communicating a signal to a power converter of the power system when the detected operating voltage is greater than a threshold voltage and when the component is not operational; and
shorting together a plurality of terminals of the electric machine.

17. The method of claim 16, further comprising:
comparing the detected operating voltage to the threshold voltage.

18. The method of claim 16, further comprising:
communicating a test signal to a backup power system;
testing operation of the backup power system; and
receiving a feedback signal in response to the communicated test signal, wherein the feedback signal corresponds to test results of the testing, and wherein shorting together the plurality of terminals of the electric machine is omitted at least during testing of the backup power system.

19. The method of claim 18, further comprising:
communicating the test signal from a system controller to the backup power system; and
transmitting the feedback signal from the backup power system to the system controller.

20. The method of claim 18, further comprising:
initiating operation of a device wherein the power system resides; and
communicating the test signal in response to the initiation of the device.

21. The method of claim 18, further comprising:
communicating the test signal in response to an event that occurs during operation of the electrical system.

22. The method of claim 16 wherein determining if the component is operational further comprises determining if a house keeping power supply is operational such that the signal is communicated to the power converter when the detected operating voltage is greater than the threshold voltage and when the house keeping power supply is not operational.

23. The method of claim 16 wherein determining if the component is operational further comprises determining if a system controller is operational such that the signal is communicated to the power converter when the detected operating voltage is greater than the threshold voltage and when the system controller is not operational.

24. The method of claim 16 wherein determining if the component is operational further comprises:
determining if a system controller is operational; and
determining if a house keeping power supply is operational, wherein the signal is communicated to the power converter when the detected operating voltage is greater than the threshold voltage and when either of the system controller and the house keeping power supply is not operational.

25. The method of claim 24 wherein the signal is communicated to the power converter when the detected operating voltage is greater than the threshold voltage and when both of the system controller and the house keeping power supply are not operational.

26. The method of claim 16, wherein communicating the signal to the power converter further comprises communicating a plurality of gating signals to a plurality of transistor devices such that when the transistor devices are gated, the plurality of terminals of the electric machine are shorted together.

27. A system preventing over voltages in a power system coupled to an electric machine, comprising:
means for detecting an operating voltage on a high voltage direct current (HVDC) bus;
means for determining if at least one component of the power system is operational;
means for communicating a signal to a power converter of the power system when the detected operating voltage is greater than a threshold voltage and when the component is not operational; and
means to short a plurality of terminals of the electric machine together when the signal is communicated.

28. The system of claim 27, further comprising means for comparing the detected operating voltage to the threshold voltage.

29. The system of claim 27 wherein the means for determining if the component is operational further comprises:
means for determining if a house keeping power supply is operational wherein the signal is communicated to the power converter when the detected operating voltage is greater than the threshold voltage and when the house keeping power supply is not operational.

30. The system of claim 27 wherein the means for determining if the component is operational further comprises:
means for determining if a system controller is operational wherein the signal is communicated to the power converter when the detected operating voltage is greater than the threshold voltage and when the system controller is not operational.

31. The system of claim 27 wherein the means for determining if the component is operational further comprises:
means for determining if a system controller is operational; and
means for determining if a house keeping power supply is operational,
wherein the signal is communicated to the power converter when the detected operating voltage is greater than the threshold voltage and when either of the system controller and the house keeping power supply is not operational.

32. The system of claim 31 wherein the signal is communicated to the power converter when the detected operating voltage is greater than the threshold voltage and when both of the system controller and the house keeping power supply are not operational.

33. The method of claim 27, further comprising:
means for communicating a test signal to the backup power system during continued operation of said power system;
means for testing operation of the backup power system; and
means for receiving a feedback signal in response to the communicated test signal, wherein the feedback signal corresponds to test results of the testing, and wherein shorting together the plurality of terminals of the electric machine is omitted at least during testing of the backup power system.

34. The method of claim 33, further comprising:
means for communicating the test signal from a system controller to the backup power system; and
means for transmitting the feedback signal from the backup power system to the system controller.

35. The method of claim 33, further comprising:
means for initiating operation of a device wherein the power system resides; and
means for communicating the test signal in response to the initiation of the device.

36. The method of claim 33, further comprising:
means for communicating the test signal in response to an event that occurs during operation of the electrical system.

37. A processor-readable physical storage medium having stored thereon instructions configured to cause a processor to prevent over voltages in a power system coupled to an electric machine by performing the steps of:
determining an operating voltage on a high voltage direct current bus;
determining if at least one component of the power system is operational; and
generating a signal that is communicated to a power converter of the power system when the determined operating voltage is greater than a threshold voltage and when the component is not operational, to cause shorting together of a plurality of terminals of the electric machine.

38. The medium of claim 37, further comprising instructions for comparing the detected operating voltage to the threshold voltage.

39. The medium of claim 37 wherein the instructions for determining if the component is operational further comprises instructions for determining if a house keeping power supply is operational such that the signal is communicated to the power converter when the detected operating voltage is greater than the threshold voltage and when the house keeping power supply is not operational.

40. The medium of claim 37 wherein the instructions for determining if the component is operational further comprises instructions for determining if a system controller is operational such that the signal is communicated to the power converter when the detected operating voltage is greater than the threshold voltage and when the system controller is not operational.

41. The medium of claim 37 wherein the instructions for determining if the component is operational further comprises:
instructions for determining if a system controller is operational; and
instructions for determining if a house keeping power supply is operational,
wherein the signal is communicated to the power converter when the detected operating voltage is greater than the threshold voltage and when either of the system controller and the house keeping power supply is not operational.

42. The medium of claim 37 wherein the instructions for determining if the component is operational further comprises:
instructions for determining if a system controller is operational; and
instructions for determining if a house keeping power supply is operational, wherein the signal is communicated to the power converter when the detected operating voltage is greater than the threshold voltage and when both of the system controller and the house keeping power supply are not operational.

43. The system of claim 1 further comprising:
a system controller operable to control operation of the power converter;
a first connection configured to communicate a test signal generated by the system controller to the backup power supply to cause a testing of the backup power supply after a steady state of operation has been reached; and
a second connection configured to communicate a feedback signal generated by the backup power supply to the system controller in response to the received test signal.

44. The method of claim 16 comprising the additional step of:
determining that said power system has reached a steady operating condition prior to detecting an operating voltage on a high voltage direct current (HVDC) bus.

45. The system of claim 27 additionally comprising a:
means for communicating a test signal to the backup power system;
means for testing operation of the backup power system after a steady operating condition has been reached; and
means for receiving a feedback signal in response to the communicated test signal, wherein the feedback signal corresponds to test results of the testing, and wherein shorting together the plurality of terminals of the electric machine is omitted at least during testing of the backup power system.

* * * * *